(12) United States Patent
Jing et al.

(10) Patent No.: US 11,186,506 B2
(45) Date of Patent: Nov. 30, 2021

(54) SUBSURFACE FLOW CONSTRUCTED WETLAND AND METHOD OF USING THE SAME FOR WASTEWATER TREATMENT

(71) Applicants: Shandong University, Jinan (CN); Shandong Academy of Environmental Sciences and Environmental Engineering Co., Ltd., Jinan (CN)

(72) Inventors: Yuming Jing, Jinan (CN); Jinyong Zhang, Jinan (CN); Moxi Xue, Jinan (CN); Jielin Li, Jinan (CN); Zhenyang Song, Jinan (CN)

(73) Assignees: SHANDONG UNIVERSITY, Jinan (CN); SHANDONG ACADEMY OF ENVIRONMENTAL SCIENCES AND ENVIRONMENTAL ENGINEERING CO., LTD., Jinan (CN)

(*) Notice: Subject to any disclaimer, the term of this patent is extended or adjusted under 35 U.S.C. 154(b) by 0 days.

(21) Appl. No.: 16/817,722

(22) Filed: Mar. 13, 2020

(65) Prior Publication Data
US 2020/0290907 A1    Sep. 17, 2020

(30) Foreign Application Priority Data
Mar. 15, 2019  (CN) .......................... 201910201321.0

(51) Int. Cl.
*C02F 3/32*     (2006.01)
*C02F 3/34*     (2006.01)
*C02F 101/10*   (2006.01)
*C02F 101/16*   (2006.01)

(52) U.S. Cl.
CPC .............. *C02F 3/327* (2013.01); *C02F 3/348* (2013.01); *C02F 2101/105* (2013.01); *C02F 2101/16* (2013.01)

(58) Field of Classification Search
CPC .... C02F 3/327; C02F 3/348; C02F 2101/105; C02F 2101/16; C02F 3/302; C02F 2101/38; C02F 3/32; Y02W 10/10
USPC .......................... 210/602, 615, 616, 617, 290
See application file for complete search history.

(56) References Cited

U.S. PATENT DOCUMENTS

| | | | |
|---|---|---|---|
| 2008/0251448 A1* | 10/2008 | Kent ........................ | C02F 3/306 210/602 |
| 2011/0303609 A1* | 12/2011 | Isovitsch Parks ....... | B01J 20/08 210/663 |
| 2016/0207808 A1* | 7/2016 | Castellanos ............... | C02F 1/32 |
| 2017/0107131 A1* | 4/2017 | Li .............................. | E02B 3/14 |

FOREIGN PATENT DOCUMENTS

CN    202968310    *    6/2013

* cited by examiner

*Primary Examiner* — Fred Prince
(74) *Attorney, Agent, or Firm* — Matthias Scholl P.C.; Matthias Scholl

(57) ABSTRACT

A subsurface flow constructed wetland (SFCW) includes a sand layer having a ventilation property of 90 mL/(cm·s) and a permeation rate of less than 0.3 kg/m²/h under a two-meter-high pressure head, a filter layer disposed on the sand layer, and a gabion module disposed on the filter layer. The filter layer includes fine sand with a particle size of 0.25-0.35 cm. The gabion module includes a gabion box including a plant layer and a filler layer, and the filler layer is disposed on the plant layer.

10 Claims, 1 Drawing Sheet

SUBSURFACE FLOW CONSTRUCTED WETLAND AND METHOD OF USING THE SAME FOR WASTEWATER TREATMENT

CROSS-REFERENCE TO RELATED APPLICATIONS

Pursuant to 35 U.S.C. § 119 and the Paris Convention Treaty, this application claims foreign priority to Chinese Patent Application No. 201910201321.0 filed Mar. 15, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245. First Street, 18th Floor, Cambridge, Mass. 02142.

BACKGROUND

The disclosure relates to a subsurface flow constructed wetland (SFCW) for wastewater treatment, and also to a method of using the same for wastewater treatment.

The subsurface flow constructed wetland is widely used to remove contaminants from wastewater. The constructed wetland includes a pond made of lime and soil in the volume ratio of 3:7, which is impermeable and easy to cause anoxia and rotten roots of plant roots. In addition, for wastewaters containing few of organic matters, because the carbon source is insufficient in the denitrification process, the denitrification effect of the constructed wetland is not good.

SUMMARY

The disclosure provides a subsurface flow constructed wetland efficient in denitrification.

A subsurface flow constructed wetland (SFCW) comprises a sand layer having a ventilation property of 90 mL/(cm·s) and a permeation rate of less than 0.3 kg/m$^2$/h under a two-meter-high pressure head, a filter layer disposed on the sand layer, and a gabion module disposed on the filter layer. The filter layer comprises fine sand with a particle size of 0.25-0.35 cm. The gabion module comprises a gabion box comprising a plant layer and a filler layer, and the filler layer is disposed on the plant layer.

The sand layer is breathable and impermeable, can prevent the wastewater in the pond from entering the surrounding soil layer, and cannot hinder the air flow between the soil and the pond, facilitating the plant growth and preventing root from rotting. The filter layer comprising the fine sand is disposed on the surface of the sand layer, which can effectively filter the impurities from wastewater and increase the service life of the sand layer.

The plant layer comprises harvested wetland plants or cellulose material, such as straw, rice straw, etc. The thickness of the plant layer is 5-15 cm. The filler layer comprises stones, volcanics, coal slags, or a mixture thereof. The thickness of the filler layer is 80-90 cm.

The subsurface flow constructed wetland operates as follows:

First, aquatic plants are planted on the filler layer of the gabion module. In the early stage of plant growth, a microbial agent is added to the plants to maintain the normal operation of the wetland. The microbial agent comprises denitrifying bacteria, nitrifying bacteria and *Bacillus*. In the mature stage of the aquatic plants, lignocellulose-degradation microbial community is added to the wetland to participate in the decomposition of the filler covered on the plant layer and the leaves falling off the plants, further providing a carbon source for the denitrification reaction in the subsurface flow wetlands.

The mass ratio of the denitrifying bacteria, the nitrifying bacteria and the *Bacillus* is between 3:1:1 and 4:1:1.

The addition amount of the microbial agent is 1-1.5 kg/m$^3$ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP)≤0.5 mg/L. The microbial agent is added regularly within 5-15 days.

The mass ratio of the lignocellulose-degradation microbial community and the denitrifying bacteria agent is 1:1 to 1:2. When the planting density of aquatic plants is greater than 15 plants/m$^2$, the mass ratio of lignocellulose-degradation microbial community and denitrifying bacteria agent is 1:1; when the planting density of aquatic plants is not greater than 15 plants/m$^2$, the mass ratio of lignocellulose-degradation microbial community and denitrifying bacteria agent is 1:2. The lignocellulose-degradation microbial community is added after the plants had adapted to their environment.

The addition amount of the lignocellulose-degradation microbial community is 0.2-0.5 kg/m$^3$ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP)≤0.5 mg/L. The lignocellulose-degradation microbial community is added regularly within 5-15 days.

The subsurface flow constructed wetland of the disclosure has the advantages of high-efficiency denitrification, impermeability, and ventilation properties. The use of the sand layer instead of lime soil can effectively prevent the plant roots of the wetland from rotting, promote root growth, and improve the survival rate of aquatic plants in the subsurface flow wetland; when the gabion module is applied to the filler-laying process of subsurface flow wetlands, a filling device can be used to fill the plant layer thus improving the loading efficiency; the harvested plants can effectively improve the denitrification effect and provide a carbon source for the denitrification process; the addition of lignocellulose-degradation microbial community can effectively control the decomposition efficiency of plants, thereby achieving a controlled release of the carbon source.

Figure 1:
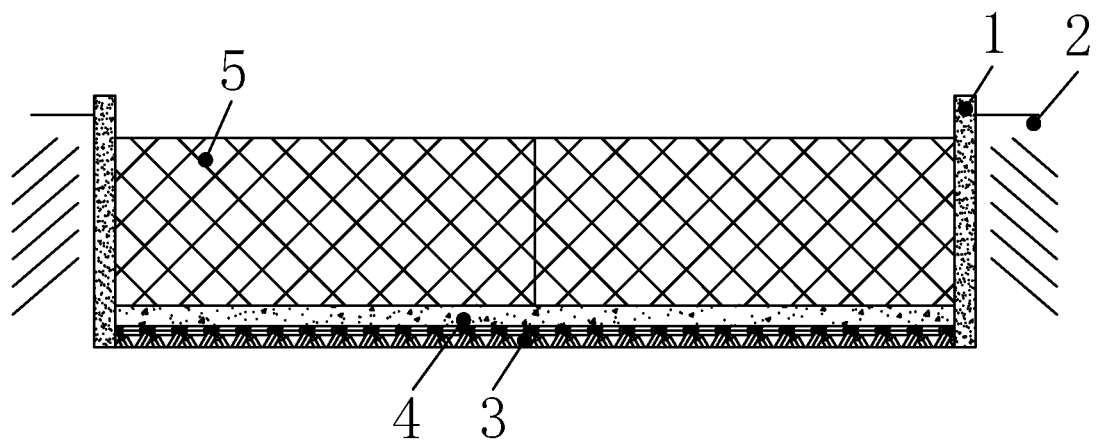
FIG. 1 is a cross-sectional view of a subsurface flow constructed wetland according to one embodiment of the disclosure.
Figure 2:
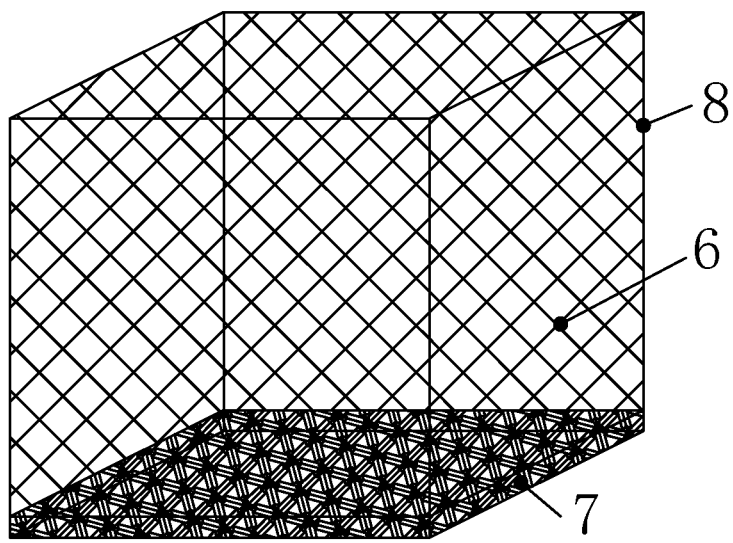
FIG. 2 is a schematic diagram of a gabion module according to one embodiment of the disclosure.

In the drawings, the following reference numerals are used: 1. Wall; 2. Soil layer; 3. Sand layer, 4. Filter layer; 5. Gabion module; 6. Filler layer; 7. Plant layer; 8. Gabion box.

DETAILED DESCRIPTION OF THE EMBODIMENTS

The disclosure provides a subsurface flow constructed wetland with high-efficiency denitrification, impermeability, and ventilation properties, which can improve the nitrogen-removal efficiency, promote denitrification and improve the quality of the effluent water from subsurface flow wetlands.

As shown in FIG. 1, the subsurface flow constructed wetland comprises a pond comprising two walls 1 on both sides. The walls are built with concrete and have a thickness of 5-15 cm. The pond is disposed in the soil layer 2. The subsurface flow constructed wetland comprises a sand layer 3, a filter layer 4 and a gabion module 5. The sand layer, the filter layer and the gabion module are laid in the soil layer from bottom to top, in sequence.

The sand layer 3 has a thickness of 5-15 cm. The sand layer has strong surface tension with water; therefore, the sand layer can prevent the wastewater in the pond from entering the surrounding soil layer, and cannot hinder the air flow between the soil and the pond, facilitating the plant growth and preventing root-rotting.

The filter layer 4 comprising the fine sand with a particle size of 0.25-0.35 cm. Because the impurities can directly affect the waterproof performance of the sand layer, the filter layer 4 is covered on the sand layer to effectively filter impurities from wastewater, and improves the ventilation effect and the service life of sand layer.

The gabion module 5 is used for laying the pond of the wetland. The gabion module 5 comprises a gabion box 8, a plant layer 7 disposed on the bottom of the gabion box 8, and a filler layer 6 covering the plant layer 7. The gabion box 8 is an uncovered gabion box with a size of 100×100×100 cm. The material of the gabion box 8 is selected from ordinary galvanized steel wire, galvanized steel wire with 5% aluminum alloy, galvanized steel wire with 10% aluminum alloy, polyester film galvanized steel wire and other materials. The material of the plant layer is harvested plants from the subsurface flow constructed wetland, straw containing higher lignin and cellulose, rice straw, and wood chips. The plant layer 7 has a thickness of 5-15 cm. The gabion box is unfolded and pulled up, and the plant layer 7 is placed at the bottom of the gabion box, which can prevent the filler from leaking from the gabion box mesh of which the diameter is larger than that of the filler. Therefore, the wetland plants are filled at the bottom of the gabion box (the plants can also be straw or other plants containing lignin and cellulose, to achieve secondary use and reduce waste emissions), followed by loading the filler layer 6 on the plant layer. The material of the filler layer can be stone or the other fillers selected according to the effluent water index and engineering cost, such as volcanic rock, coal slag, etc. The thickness of the filler layer 6 is 80-90 cm. The gabion module 5 can be laid with a filling device, facilitating to improve the laying efficiency of the subsurface flow wetland. The gabion module can meet the demand of carbon source for the denitrification reaction of subsurface flow wetlands.

To construct the wetland, the sand layer instead of lime soil is laid on the soil layer; the filter layer comprising fine sand is laid on the sand layer; the plant layer is laid on the filter layer, and the filler layer is laid on the plant layer. The plant layer and the filler layer are two-unit modules in the gabion box in which the filler layer can be laid by a large-scale mechanical operation for easy construction. The harvested wetland plants act as a carbon source that is continuously released to the microbes to improve the nitrogen-removal efficiency. When the water quality is worse or a large amount of carbon source is needed, the lignocellulose-degradation microbial community can be added to the subsurface flow wetlands to accelerate the decomposition of lignin and cellulose in the plants, thereby increasing the nitrogen-removal efficiency of the denitrification reaction.

Prior to the treatment process of wastewater, first, aquatic plants are planted on the filler layer of the gabion module. In the early stage of plant growth, a microbial agent is added to the plants to maintain the normal operation of the wetland. The microbial agent comprising denitrifying bacteria, nitrifying bacteria and *Bacillus*. The mass ratio of the denitrifying bacteria, the nitrifying bacteria and the *Bacillus* is between 3:1:1 and 4:1:1. The addition amount of the microbial agent is 1-1.5 kg/m$^3$ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP)≤0.5 mg/L. The microbial agent is added regularly within 5-15 days.

At the stage of plant growth and maturity, lignocellulose-degradation microbial community is added to the wetland to participate in the decomposition of the filler covered on the plant layer and the leaves falling off the plants, further providing a carbon source for the denitrification reaction in the subsurface flow wetlands. The lignocellulose-degradation microbial community is added to the plant layer after the plants had adapted to their environment. The mass ratio of the lignocellulose-degradation microbial community and the denitrifying bacteria is 1:1 to 1:2. When the planting density of aquatic plants is greater than 15 plants/m$^2$, the mass ratio of lignocellulose-degradation microbial community and denitrifying bacteria is 1:1; when the planting density of aquatic plants is not greater than 15 plants/m$^2$, the mass ratio of lignocellulose-degradation microbial community and the denitrifying bacteria is 1:2. The addition amount of the lignocellulose-degradation microbial community is 0.2-0.5 kg/m$^3$ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP)≤0.5 mg/L. The lignocellulose-degradation microbial community is added regularly within 5-15 days.

Example 1

A subsurface flow constructed wetland has a water flow of 1000 m$^3$/d, a floor area of 3000 m$^2$, and a surface hydraulic load of 0.33 m/d.

The thickness of the concrete wall 1 is 10 cm. The thickness of the sand layer 3 is 10 cm. The material of the filter layer 4 is fine sand with a particle size of 0.4 cm. The gabion box 8 is an uncovered gabion box with a size of 100×100×100. The thickness of a plant layer 7 is 10 cm. The material of the plant layer is selected from the group comprising the plants harvested from subsurface flow wetlands, straw, and wood chips. The material of the filler layer 6 is high quality gravels with a thickness of 90 cm and a particle size of 3-5 cm.

At the beginning of operation, a microbial agent is artificially added to the plants to maintain the normal operation of the wetland. The microbial agent comprising denitrifying bacteria, nitrifying bacteria and *Bacillus*, where the three kinds of bacteria are existing bacterial agents. The mass ratio of denitrifying bacteria, nitrifying bacteria and *Bacillus* is 4:1:1. The addition amount of the microbial agent is 420 kg/d for 10 days. The lignocellulose-degradation microbial community is added to the plant layer after the plants had adapted to their environment. The addition amount of lignocellulose-degradation microbial community is 175 kg/d for 10 days.

The subsurface flow wetland is used to treat the wastewater from a sewage treatment plant, and the discharged wastewater satisfies the Grade I-A Discharge Standard of Pollutants for Municipal Wastewater Treatment Plant of China, with a pH of 7.5-9.0, COD content of smaller than 60 mg/L, ammonia nitrogen content of smaller than 15 mg/L, total phosphorus content of smaller than 0.5 mg/L, and suspended solids (SS) content of less than 10 mg/L.

The sand layers, denitrifying bacteria, nitrifying bacteria, *Bacillus*, and lignocellulolytic bacteria described in the disclosure are all conventional materials known to those skilled in the art, and will not be described again here.

It will be obvious to those skilled in the art that changes and modifications may be made, and therefore, the aim in the appended claims is to cover all such changes and modifications.

What is claimed is:

1. A subsurface flow constructed wetland (SFCW), comprising:
   1) a sand layer having a ventilation property of 90 mL/(cm·s) and a permeation rate of less than 0.3 kg/m²/h under a two-meter-high pressure head;
   2) a filter layer disposed on the sand layer, the filter layer comprising fine sand with a particle size of 0.25-0.35 cm; and
   3) a gabion module disposed on the filter layer, the gabion module comprising a gabion box comprising a plant layer and a filler layer, and the filler layer being disposed on the plant layer.

2. The constructed wetland of claim 1, wherein the plant layer comprises harvested wetland plants or cellulose material.

3. The constructed wetland of claim 1, wherein the plant layer has a thickness of 5-15 cm.

4. The constructed wetland of claim 1, wherein the filler layer comprises stones, volcanics, coal slags, or a mixture thereof.

5. The constructed wetland of claim 1, wherein the filler layer has a thickness of 80-90 cm.

6. A method of wastewater treatment using the subsurface flow constructed wetland of claim 1, the method comprising:
   planting aquatic plants in the gabion box; in an early growth stage of the aquatic plants, adding a microbial agent comprising denitrifying bacteria, nitrifying bacteria and *Bacillus* to the gabion box; in a mature stage of the aquatic plants, adding a lignocellulose-degradation microbial community to the gabion box to decompose the fillers and fallen leaves of the aquatic plants and supply carbon for a denitrification reaction.

7. The method of claim 6, wherein a mass ratio of the denitrifying bacteria, the nitrifying bacteria and the *Bacillus* is between 3:1:1 and 4:1:1.

8. The method of claim 6, wherein an addition amount of the microbial agent is 1-1.5 kg/m³ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP) ≤0.5 mg/L.

9. The method of claim 6, wherein a mass ratio of the lignocellulose-degradation microbial community to the denitrifying bacteria is between 1:1 and 1:2.

10. The method of claim 6, wherein an addition amount of the lignocellulose-degradation microbial community is 0.2-0.5 kg/m³ when an influent to the subsurface flow constructed wetland is 1A standard water from a waste water treatment plant, and a surface hydraulic load of the subsurface flow constructed wetland is 0.3-1 m/d, wherein the 1A standard water has the following parameters: chemical oxygen demand (COD)≤50 mg/L; $NH_3$—N≤5 mg/L; total nitrogen (TN)≤15 mg/L; total phosphorus (TP)≤0.5 mg/L.

* * * * *